(12) United States Patent
Rossi et al.

(10) Patent No.: US 10,728,104 B2
(45) Date of Patent: Jul. 28, 2020

(54) TIME-DEPENDENT NETWORK EMBEDDING

(71) Applicant: Adobe Inc., San Jose, CA (US)

(72) Inventors: Ryan A. Rossi, Mountain View, CA (US); Sungchul Kim, San Jose, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 16/192,313

(22) Filed: Nov. 15, 2018

(65) Prior Publication Data

US 2020/0162340 A1    May 21, 2020

(51) Int. Cl.
| | | |
|---|---|---|
| *H04L 12/24* | (2006.01) | |
| *H04L 12/26* | (2006.01) | |
| *H04L 12/751* | (2013.01) | |
| *H04L 29/08* | (2006.01) | |

(52) U.S. Cl.
CPC ........ *H04L 41/145* (2013.01); *H04L 41/0246* (2013.01); *H04L 41/147* (2013.01); *H04L 43/045* (2013.01); *H04L 45/02* (2013.01); *H04L 67/10* (2013.01)

(58) Field of Classification Search
CPC ...................................................... H04L 45/02
See application file for complete search history.

(56) References Cited

U.S. PATENT DOCUMENTS

| | | | | |
|---|---|---|---|---|
| 8,290,975 B2 * | 10/2012 | Gao | .................... | G06F 16/3322 707/767 |
| 8,566,030 B1 * | 10/2013 | Demiryurek | ....... | G01C 21/3492 701/409 |
| 9,697,260 B2 * | 7/2017 | Hale | .................... | H04L 12/1813 |
| 10,019,190 B2 * | 7/2018 | Rao | ....................... | G06T 11/206 |
| 10,127,115 B2 * | 11/2018 | Kandylas | ............ | G06F 11/1446 |
| 10,331,753 B1 * | 6/2019 | Zhang | ................... | G06F 16/909 |
| 2011/0078189 A1 * | 3/2011 | Bonchi | ................ | G06F 16/258 707/776 |

(Continued)

OTHER PUBLICATIONS

Nguyen et al, "Continuous-Time Dynamic Network Ennbeddings", Apr. 23-27, 2018 (Year: 2018).*

(Continued)

*Primary Examiner* — Lashonda T Jacobs
(74) *Attorney, Agent, or Firm* — SBMC (57) ABSTRACT

In implementations of time-dependent network embedding, a computing device maintains time-dependent interconnected data in the form of a time-based graph that includes nodes and node associations that each represent an edge between two of the nodes in the time-based graph based at least in part on a temporal value that indicates when the two nodes were associated. The computing device includes a network embedding module that is implemented to traverse one or more of the nodes in the time-based graph along the node associations, where the traversal is performed with respect to the temporal value of each of the edges that associate the nodes. The network embedding module is also implemented to determine a time-dependent embedding for each of the nodes traversed in the time-based graph, the time-dependent embedding for each of the respective nodes being representative of feature values that describe the respective node.

20 Claims, 5 Drawing Sheets

(56) References Cited

U.S. PATENT DOCUMENTS

| | | | | |
|---|---|---|---|---|
| 2013/0268565 | A1* | 10/2013 | Stergiou | G06F 16/9024 |
| | | | | 707/798 |
| 2014/0164511 | A1* | 6/2014 | Williams | H04L 67/22 |
| | | | | 709/204 |
| 2015/0074044 | A1* | 3/2015 | Metreveli | G06F 16/2343 |
| | | | | 707/609 |
| 2015/0081725 | A1* | 3/2015 | Ogawa | H04L 29/08072 |
| | | | | 707/754 |
| 2017/0257291 | A1* | 9/2017 | Zhao | H04L 41/12 |
| 2017/0351406 | A1* | 12/2017 | Rossi | G06T 11/206 |
| 2017/0357905 | A1* | 12/2017 | Rossi | G06N 5/022 |
| 2017/0365071 | A1* | 12/2017 | Rossi | H03M 7/30 |
| 2018/0367414 | A1* | 12/2018 | Raghavendra | H04L 41/22 |
| 2019/0286752 | A1* | 9/2019 | Leskovec | G06F 16/24537 |
| 2019/0310212 | A1* | 10/2019 | Ando | G01F 1/86 |

OTHER PUBLICATIONS

Aggarwal,"Evolutionary Network Analysis: A Survey", Jul. 1, 2014, 36 pages.
Aggarwal,"On Dense Pattern Mining in Graph Streams", Sep. 1, 2010, 10 pages.
Aggarwal,"Outlier Detection in Graph Streams", Apr. 11, 2011, 11 pages.
Ahmed,"Distributed Large-scale Natural Graph Factorization", Dec. 13, 2013, 11 pages.
Ahmed,"Inductive Representation Learning in Large Attributed Graphs", Nov. 22, 2017, 3 pages.
Ahmed,"Interactive Visual Graph Analytics on the Web", Apr. 21, 2015, 4 pages.
Ahmed,"On Sampling from Massive Graph Streams", Mar. 7, 2017, 13 pages.
Albert,"The Diameter of the world wide web", Sep. 10, 1999, 5 pages.
Belkin,"Laplacian Eigenmaps for Dimensionality Reduction and Data Representation", Neural Computation 15 (2002), Dec. 8, 2002, pp. 1373-1396.
Bogers,"Movie Recommendation using Random Walks over the Contextual Graph", Jan. 2010, 5 pages.
Bonchi,"Learning influence probabilities in social networks", in Proceedings of the third ACM international conference on Web search and data mining, Feb. 2010, 10 pages.
Broder,"Graph Structure in the Web", Computer Networks 33, 1-6 (2000), Jun. 2000, 15 pages.
Cai,"Facilitating Real-Time Graph Mining", In Proceedings of the Fourth International Workshop on Cloud Data Management. 8, Oct. 29, 2012, 8 pages.
Camacho,"Robust Patterns in Food Web Structure", May 14, 2002, 5 pages.
Cavallari,"Learning Community Embedding with Community Detection and Node Embedding on Graphs", Nov. 2017, pp. 377-386.
Cazabet,"Dynamic Community Detection", Sep. 1, 2014, 12 pages.
Chung,"Random walks and local cuts in graphs", May 1, 2007, 13 pages.
Coa,"GraRep: Learning Graph Representations with Global Structural Information", Oct. 23, 2015, 10 pages.
Dong,"metapath2vec: Scalable Representation Learning for Heterogeneous Networks", Aug. 13, 2017, pp. 135-144.
Dunlavy,"Temporal Link Prediction using Matrix and Tensor Factorizations", Jun. 19, 2010, 29 pages.
Dunne,"Food-web structure and network theory: The role of connectance and size", Oct. 1, 2002, pp. 12917-12922.
Faloutsos,"On Power-Law Relationships of the Internet Topology", Oct. 1999, 12 pages.
Fu,"Dynamic Mixed Membership Blockmodel for Evolving Networks", Jun. 14, 2009, 8 pages.
Gleich,"A Dynamical System for PageRank with Time-Dependent Teleportation", Nov. 18, 2012, 30 pages.
Grady,"Random Walks for Image Segmentation", IEEE Transactions on Pattern Analysis and Machine Intelligence, vol. 28, No. 11, Nov. 2006, 17 pages.
Grover,"node2vec: Scalable Feature Learning for Networks", Jul. 3, 2016, 10 pages.
Guha,"Graph Synopses, Sketches, and Streams: A Survey", Aug. 27, 2012, pp. 2030-2031.
Hisano,"Semi{supervised Graph Embedding Approach to Dynamic Link Prediction", Oct. 14, 2016, 15 pages.
Holme,"Temporal Networks", Dec. 16, 2011, 28 pages.
Java,"Modeling the Spread of Influence on the Blogosphere", Mar. 14, 2006, 7 pages.
Jeong,"Lethality and Centrality in Protein Networks", Jun. 2001, 5 pages.
Jeong,"The large-scale organization of metabolic networks", Oct. 5, 2000, pp. 651-654.
Kamra,"Deep Generative Dual Memory Network for Continual Learning", May 25, 2018, 15 pages.
Kleczkowski,"Mean-eld-type equations for spread of epidemics: the 'small world' model", Dec. 1999, pp. 355-360.
Krebs,"Mapping Networks of Terrorists Cells", Mar. 2002, pp. 43-52.
Lassez,"Ranking Links on the Web: Search and Surf Engines", Jun. 2008, 11 pages.
Latapy,"Computing communities in large networks using random walks", Dec. 14, 2004, 15 pages.
Lee,"Deep Graph Attention Model", Sep. 15, 2017, 9 pages.
Liao,"Attributed Social Network Embedding", May 14, 2017, 12 pages.
Liu,"Link Prediction Based on Local Random Walk", Jan. 14, 2010, 6 pages.
Lovasz,"Random Walks on Graphs: A Survey", Jan. 1993, 46 pages.
Maslov,"Specificity and stability in topology of protein networks", May 17, 2002, 17 pages.
May,"Infection dynamics on scale-free networks", Nov. 19, 2001, 4 pages.
McGovern,"Exploiting Relational Structure to Understand Publication Patterns in HighEnergy Physics", Dec. 2003, pp. 165-172.
Mikolov,"Efficient estimation of word representations in vector space", arXiv preprint arXiv:1301.3781 (2013), Sep. 7, 2013, 12 pages.
Moore,"Epidemics and percolation in small-world networks", Jan. 7, 2000, 6 pages.
Neville,"Using Relational Knowledge Discovery to Prevent Securities Fraud", Aug. 21, 2005, 10 pages.
Newman,"The structure of scientific collaboration networks", Jan. 16, 2001, pp. 404-409.
Ng,"On Spectral Clustering: Analysis and an Algorithm", 8 pages.
O'Madadhain,"Prediction and Ranking Algorithms for EventBased Network Data", Dec. 2005, pp. 23-30.
Page,"The PageRank Citation Ranking: Bringing Order to the Web", Jan. 29, 1998, 17 pages.
Pastor-Satorras,"Epidemic spreading in scale-free networks", Feb. 1, 2008, 13 pages.
Perozzi,"DeepWalk: Online Learning of Social Representations", Jun. 27, 2014, 10 pages.
Pienta,"Scalable Graph Exploration and Visualization: Sensemaking Challenges and Opportunities", Mar. 2015, pp. 271-278.
Ranshous,"Anomaly detection in dynamic networks: a survey", Jun. 2015, pp. 223-247.
Ribiro,"struc2vec: Learning Node Representations from Structural Identity", Jul. 3, 2017, 10 pages.
Rossi,"Deep Feature Learning for Graphs", Oct. 16, 2017, 11 pages.
Rossi,"Modeling Dynamic Behavior in Large Evolving Graphs", Feb. 4, 2013, 11 pages.
Rossi,"Modeling the Evolution of Discussion Topics and Communication to Improve Relational Classification", Jul. 25, 2010, 9 pages.
Rossi,"The Network Data Repository with Interactive Graph Analytics and Visualization", http://networkrepository.com/, Mar. 4, 2015, pp. 4292-4293.
Rossi,"Time-Evolving Relational Classification and Ensemble Methods", Jun. 2, 2012, 12 pages.

(56) References Cited

OTHER PUBLICATIONS

Servetto,"Constrained Random Walks on Random Graphs: Routing Algorithms for Large Scale Wireless Sensor Networks", 10 pages.
Soundarajan,"Generating Graph Snapshots from Streaming Edge Data", Apr. 11, 2016, 2 pages.
Sun,"GraphScope: Parameter-free Mining of Large Time-evolving Graphs", Dec. 14, 2007, 10 pages.
Tang,"LINE: Large-scale Information Network Embedding", Mar. 12, 2015, 11 pages.
Wagner,"The small world inside large metabolic networks", Jan. 24, 2001, pp. 1803-1810.
Watts,"Collective dynamics of 'small-world' networks", Jun. 4, 1998, 3 pages.

* cited by examiner

TIME-DEPENDENT NETWORK EMBEDDING

BACKGROUND

Generally, relational data in graph form can be used to represent networks in many different types of domains, such as Internet-related networks, in the fields of science and research collaboration, in epidemiology related to the study of patterns and causes of health conditions, communication analysis between members and groups in social networks, advertising and marketing analytics, in the study of ecosystems, power grid dynamics, and many others. Many of these types of networks are dynamic and the network entities that are represented as nodes in a graph continuously evolve over time. Generally, the links or connections between the network entities may be represented as any form of citations, collaborations, associations, functions, communications, co-locations, shared mechanisms, or many other explicit or implicit relationships. These network entity connections also change and evolve over time with the addition, deletion, and updates of various network entities in a naturally dynamic network.

The temporal information related to the changes over time in a dynamic network is an often overlooked, but important factor needed to accurately model, predict, and understand network data. Despite the importance and ubiquity of these dynamics, such as for user events, user actions, and interactions in many real-world networks, conventional approaches to predicting, analyzing, and modeling dynamic networks do not take into account the temporal information in network data. Rather, typical analysis techniques propose to model a dynamic network as a sequence of static snapshot graphs, where each static snapshot graph represents the edges (e.g., the network entity connections) that occur over a user-specified discrete-time interval, such as for one day or during a week. This is a very coarse approximation of an actual dynamic network that is continuously evolving and changing over time, also commonly referred to as a continuous-time dynamic network (CTDN). In addition to the loss of temporal information using static snapshots of graph representations, many other issues, such as selecting an appropriate aggregation granularity which is a challenging problem in itself, can lead to poor predictive performance or misleading results when attempting to model, predict, and understand the network data for a dynamic network.

SUMMARY

This Summary introduces features and concepts of time-dependent network embedding, which is further described below in the Detailed Description and shown in the Figures. This Summary should not be considered to describe essential features of the claimed subject matter, nor used to determine or limit the scope of the claimed subject matter.

Aspects of time-dependent network embedding are described. In implementations, a computing device can receive and maintain time-dependent interconnected data in the form of a time-based graph that includes nodes and node associations. A node association of the time-based graph represents an edge between two of the nodes based at least in part on a temporal value that indicates the time when the two nodes were associated. The time-based graph is representative of a dynamic network that evolves over time as nodes of the network are added, deleted, and/or updated in the time-based graph and identified by the increasing temporal values of time. For example, the time-based graph may represent a social network that evolves over time as members of the social network interact with each other, such as via messages over a communication network, and the node associations each represent an interaction between two of the members of the social network. In another example, the time-based graph represents a continuous-time dynamic network (CTDN), such as any type of dynamic network that evolves over time with the addition, deletion, and updates of various network entities and associations.

The computing device implements a network embedding module that can determine one of the node associations in the time-based graph as an initial edge selection from which to start traversing the nodes in the time-based graph. In implementations, the determination of the one node association as the initial edge selection from which to start traversing the graph can be based on sampling an initial time from a distribution of the temporal values of the respective node associations, or can be determined based on sampling an arbitrary distribution of the node associations.

The network embedding module is implemented by the computing device to traverse one or more of the nodes in the time-based graph along the node associations that represent the edges between the nodes, starting from the determined initial edge selection. The nodes of the time-based graph are traversed with respect to the temporal value of each of the edges that associate the nodes, such as traversing the node associations that occur later in time. The time-based graph is traversed in increasing temporal value of each of the edges effective to traverse a subsequent node association that occurs later in time than a previous node association. The network embedding module can be implemented to traverse the nodes in the time-based graph using a random unbiased traversal with respect to traversing the node associations that occur later in time, or alternatively, using a random biased traversal with respect to traversing the node associations that occur later in time and closer to the current time.

The network embedding module is implemented by the computing device to also determine a time-dependent embedding for each of the nodes traversed in the time-based graph. The time-dependent embeddings for each of the respective nodes are representative of feature values that describe a respective node. For example, the time-based graph represents a continuous-time dynamic network (CTDN) that evolves over time, and the feature values are of d-dimensional features to which machine learning can be applied to determine a time-dependent network representation of the continuous-time dynamic network. Generally, the time-dependent embeddings are the features of the network nodes, and the network embedding module is implemented to temporally bias the learning of the embeddings for time-dependent network representation.

BRIEF DESCRIPTION OF THE DRAWINGS

Implementations of time-dependent network embedding are described with reference to the following Figures. The same numbers may be used throughout to reference similar features and components that are shown in the Figures.

DETAILED DESCRIPTION

Implementations of time-dependent network embedding are described, and provide a system for learning time-dependent embeddings of continuous-time dynamic networks (CTDN), such as networks represented by graph-based relational data that evolves over time with the addition, deletion, and updates to nodes and associations between the nodes. A time-based graph can be used to represent a continuous-time dynamic network and the time-dependent embeddings can be determined for each of the nodes of the time-based graph. Generally, the time-dependent embeddings are the features of the network nodes, and a network embedding module is implemented to temporally bias the learning of the embeddings for time-dependent network representation. As described herein, the time-dependent embeddings may be used or referred to interchangeably with the terms features, representations, and encodings as pertaining to the network nodes.

The techniques of time-dependent network embedding described herein take into account the temporal aspects of time-dependent interconnected data in graph form, as used to represent the continuous-time dynamic networks in the various different types of domains. A time-based graph can be used to represent any type of network and time-dependent data, such as an Internet-related network, a science and research-based network, an epidemiology-related network, for communication analysis between members and groups in social networks, for advertising and marketing analytics, in the study of ecosystems, for power grid dynamics, and for many other types of dynamic networks. The node associations between the nodes of a time-based graph can represent any form of node association, such as citations, collaborations, associations, functions, communications, co-locations, shared mechanisms, explicit or implicit relationships, and any other type of node association. Generally, a time-based graph can represent the overall flow of information in a dynamic network, and a determination of the network embeddings as the features of the network nodes based on the temporal aspects of the time-dependent data accounts for the addition, deletion, and updates as the dynamic network evolves over time.

In aspects of time-dependent network embedding, a computing device can receive and maintain the time-dependent data in the form of a time-based graph that represents a dynamic network which evolves over time. The time-based graph includes nodes and the node associations, where a node association represents an edge between two of the nodes of the graph. The node associations are based at least in part on a temporal value that indicates the time when two nodes were associated. Additionally, any number of the node associations that represent an edge between two of the nodes of the graph may be based on temporal values that include a start time and an end time. This is representative of a dynamic network that may include a web-based session that expires after a period of time, or IP communications, such as TCP sessions over the Internet, that are only active for a period of time, etc. The computing device implements a network embedding module that can determine one of the node associations in the time-based graph as an initial edge selection from which to start traversing the nodes in the time-based graph.

The network embedding module is implemented by the computing device to then traverse one or more of the nodes in the time-based graph along the node associations that represent the edges between the nodes, starting from the determined initial edge selection. This is also referred to as a temporal random walk of the time-based graph to capture the structure of the nodes, as well as the flow of information in the dynamic network from which to determine the nodes of the network that interact with other nodes in context of the temporal aspects of the node associations. The network embedding module provides an implementation for incorporating temporal information into embedding methods based on sampling temporal random walks that respect time for learning dynamic (time-dependent) network embeddings from continuous-time dynamic networks. As an alternative implementation to determining one of the node associations in the time-based graph as the initial edge selection from which to start traversing the graph, the nodes in the time-based graph can include timestamps and the node traversal is performed as a fixed number of temporal walks from each one of the nodes.

The network embedding module that is implemented by the computing device can determine the time-dependent embeddings for the nodes traversed in the time-based graph. The time-dependent embeddings for each of the respective nodes are representative of feature values that describe a respective node. As noted above, a time-based graph may represent a continuous-time dynamic network that evolves over time, and the feature values are of d-dimensional features to which machine learning can be applied to determine a time-dependent network representation of the continuous-time dynamic network. This learning of an appropriate network representation from a continuous-time dynamic network improves the accuracy of predictive models, and the resulting time-dependent network representation captures the temporal dependencies of the continuous-time dynamic network, as well as avoids spurious or impossible sequences of events. This is in contrast to the conventional techniques of representing a dynamic network as a sequence of static snapshot graphs, where each static snapshot graph represents the edges between nodes that occur during a user-specified discrete-time interval, such as for one day or during a week. In addition, the techniques for time-dependent network embedding as described herein naturally supports learning in graph streams where node associations are updated frequently over time (e.g., every second, or millisecond), and therefore can be used for a variety of applications requiring real-time performance.

While features and concepts of time-dependent network embedding can be implemented in any number of different devices, systems, networks, environments, and/or configurations, implementations of time-dependent network embedding are described in the context of the following example devices, systems, and methods.

Figure 1:
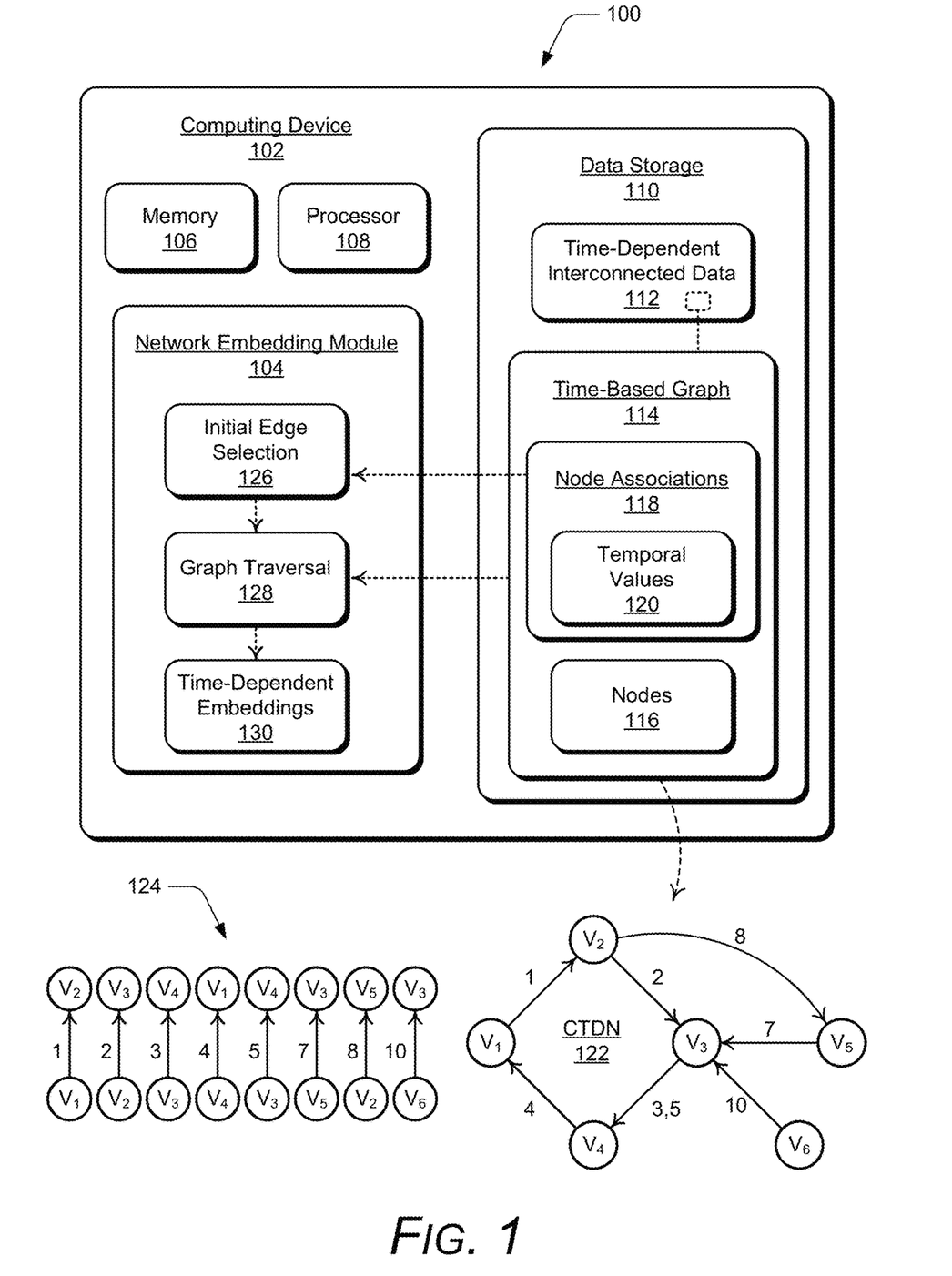
FIG. 1 illustrates an example environment in which aspects of time-dependent network embedding can be implemented.

FIG. 1 illustrates an example environment 100 in which aspects of time-dependent network embedding can be implemented. The example environment 100 includes a computing device 102, which implements features of a network embedding module 104 to determine feature embeddings of a time-dependent network with respect to temporal aspects of the network. The computing device 102 can be implemented as any type of computing device, client device, mobile phone, tablet device, communication, entertainment, gaming, media playback, and/or other type of electronic and/or computing device. In this example environment 100, the computing device 102 may include any number and combination of different components as further described with reference to the example device shown in FIG. 5. For example, the computing device 102 in this example includes memory 106 and a processor 108, as well as any type of data storage 110 that may be implemented as any suitable memory, memory device, or electronic data storage.

The computing device 102 implements the network embedding module 104, such as in software, in hardware, or as a combination of software and hardware components. In this example, the network embedding module 104 is implemented as a software application or modules, such as executable software instructions (e.g., computer-executable instructions) that are executable with a processing system (e.g., the processor 108) of the computing device 102 to implement the techniques of time-dependent network embedding. The network embedding module 104 can be stored on computer-readable storage media, such as any suitable memory device (e.g., the device memory 106) or electronic data storage implemented in the computing device 102.

In this example, the data storage 110 maintains time-dependent interconnected data 112 in the form of a time-based graph 114 that represents a dynamic network which evolves over time. The time-based graph 114 includes nodes 116 and node associations 118, where a node association 118 represents an edge between two of the nodes 116 of the time-based graph 114, and the node association is based at least in part on a temporal value 120 that indicates the time when the two nodes were associated. Additionally, any number of the node associations 118 that represent an edge between two of the nodes 116 of the time-based graph 114 may be based on temporal values 120 that include a start time and an end time. The time-based graph 114 is representative of a dynamic network that evolves over time as the nodes 116 of the network are added, deleted, and/or updated in the time-based graph 114 and identified by the increasing temporal values 120 of time. For example, the time-based graph 114 represents a continuous-time dynamic network (CTDN) 122, such as any type of dynamic network that evolves over time with the addition, deletion, and updates of the network nodes 116 and the node associations 118.

In this example, the nodes 116 of the CTDN 122 are nodes $V_1$-$V_6$, and each of the node associations 118 are identified by a temporal value 120 that indicates when two respective nodes were associated, such as indicated by the edge stream 124 that correlates the nodes and node associations by increasing temporal value. For example, the time-based graph 114 may represent a social network that evolves over time as members (e.g., the nodes 116) of the social network interact with each other, such as via messages (e.g., the node associations 118) over a communication network, and the node associations each represent an interaction between two of the members of the social network. In a social network, the nodes and edges are frequently changing with the addition and deletion of members (e.g., the nodes 116) and the relationships (e.g., the node associations 118) between the members.

In another example, the time-based graph 114 may represent analytics applications, where the nodes 116 are user client devices that access websites, and user input events, such as web page visits, online shopping views, item selections and purchases, and any other input events are represented as the node associations 118. Generally, this analytics data is an example of the time-dependent interconnected data 112, which can be modeled as the time-based graph 114.

The CTDN 122 can be used to model the actual nature of the events and interactions with respect to the temporal order and without information loss, and learn the time-dependent embeddings, such as to predict or determine which devices are associated with the same user.

Generally, the CTDN 122 is a time-based graph G=(V, $E_T$, $\mathcal{T}$), where V is the set of vertices (e.g., the nodes 116), and $E_T \subseteq V \times V \times \mathbb{R}^+$ is the set of temporal edges (e.g., the node associations 118) between the vertices in V, and $\mathcal{T}:E \rightarrow \mathbb{R}^+$ is a function that maps each edge to a corresponding timestamp. At the finest granularity (e.g., milliseconds), each edge $e_i$=(u, v, t)$\in E_T$ may be assigned a unique time t$\in \mathbb{R}^+$.

A function $f:V \rightarrow \mathbb{R}^D$ maps the nodes in G to D-dimensional time-dependent feature representations suitable for downstream machine learning tasks. The described technique learns the feature embeddings by sampling temporal random walks that respect time, where a temporal walk represents a temporally valid sequence of edges traversed in increasing order of edge times.

In CTDN 122 (e.g., represented as the time-based graph 114), events denoted by edges occur over a time span $\mathcal{T} \subseteq \mathbb{T}$ where $\mathbb{T}$ is the temporal domain for continuous-time systems $\mathbb{T} = \mathbb{R}^+$. In these networks, a valid temporal walk is denoted by a sequence of nodes connected by edges with non-decreasing timestamps. In other words, if each edge captures the time of contact between two entities, then a valid temporal walk can represent a feasible route for information. A temporal walk (e.g., traversal) from $v_1$ to $v_k$ in the time-based graph G is a sequence of vertices $\langle v_1, v_2, \ldots, v_k \rangle$ such that $\langle v_i, v_i+1 \rangle \in E_T$ for $1 \leq i < k$, and $\mathcal{T}(v_i, v_i+1) \leq \mathcal{T}(v_i+1, v_i+2)$ for $1 \leq i < (k-1)$. For two arbitrary vertices u, v$\in$V, then u is temporally connected to v if there exists a temporal walk from u to v, and where the edges (e.g., the node associations 118) are traversed in increasing order of temporal edge times. As such, temporal walks are naturally asymmetric.

Given the temporal network (e.g., CTDN 122) as the time-based graph G=(V, $E_T$, $\mathcal{T}$), the network embedding module 104 is implemented to learn the function $f:V \rightarrow \mathbb{R}^D$ that maps the nodes in G to D-dimensional time-dependent feature representations suitable for downstream machine learning tasks. Generally, the CTDN embedding system has two aspects that can be used to temporally bias determining the time-dependent network representations as the time-dependent embeddings. Notably the network embedding module 104 is implemented to determine or select one of the node associations 118 in the time-based graph 114 as an initial edge selection 126 from which to start traversing the nodes in the time-based graph. Additionally, the network embedding module 104 is implemented to traverse one or more of the nodes 116 in the time-based graph 114 along the node associations 118 that represent the edges between the nodes, starting from the determined initial edge selection 126. For each aspect of selecting the initial temporal edge from which to start the graph traversal, and selecting the next node from a set of valid temporal neighboring nodes, an unbiased variant can be used based on a uniform distribution, as well as two biased variants that select the temporal edge using a linear function and exponential function, although there are many other possibilities that can be implemented.

In implementations, the network embedding module 104 can determine the one node association 118 as the initial edge selection 126 from which to start traversing the time-based graph 114 based on sampling an initial time from a distribution of the temporal values 120 of the respective node associations 118, or can be determined based on sampling an arbitrary distribution of the node associations. As noted above, a traversal (e.g., temporal walk) from $v_1$ to $v_k$ in the time-based graph G is a sequence of vertices $\langle v_1, v_2, \ldots, v_k \rangle$ such that $\langle v_i, v_i+1 \rangle \in E_T$ for $1 \leq i < k$, and $\mathcal{T}(v_i, v_i+1) \leq \mathcal{T}(v_{i+1}, v_{i+2})$ for $1 \leq i < (k-1)$. Notably, a temporal random walk requires a starting time t, as well as a node v. In a CTDN 122, every edge $e_i = (v, u) \in E_T$ is associated with a time $t = \mathcal{T}(e_i) = \mathcal{T}(v, u)$. Therefore, the network embedding module 104 can either sample an initial time t* from a uniform or weighted distribution $\mathbb{F}_s$ and find the edge $e_i$ closest to time t*, or select an initial edge $e_i = (v, w)$ along with its associated time $t^* = \mathcal{T}(e_i)$ by sampling from an arbitrary (uniform or weighted) distribution $\mathbb{F}_s$. The choice of where to begin the temporal random walk of the time-based graph 114 is an advantageous way to temporally bias the graph traversal and therefore improve predictive performance when the time-dependent embeddings are used on a downstream time-series regression or classification task of a dynamic network.

In general, each temporal walk (e.g., graph traversal 128) starts from a temporal edge $e_i \in E_T$ at time $t = \mathcal{T}$ sampled from a distribution $\mathbb{F}_s$. The distribution used to select the initial temporal edge (e.g., the initial edge selection 126) can either be uniform, in which case there is no bias, or the selection can be temporally biased using an arbitrary weighted (non-uniform) distribution for $\mathbb{F}_s$. For instance, to determine node embeddings for a temporal link prediction task, the network embedding module 104 may begin more temporal walks from edges closer to the current time point as the events and relationships in the distant past may be less predictive or indicative of the current state of the dynamic network. In implementations, the network embedding module 104 can select the initial temporal edge (e.g., the initial edge selection 126) unbiased, where each edge $e_1 = (u, v, t) \in E_T$ has the same probability of being selected, which corresponds to sampling the initial temporal edge using a uniform distribution, as in the following EQ1:

$$Pr(e) = 1/|E_T|$$

The network embedding module 104 can also be implemented to select the initial temporal edge (e.g., the initial edge selection 126) biased with one of two techniques to temporally bias the selection of the initial edge that determines the start of the temporal random walk. In particular, the network embedding module 104 is implemented to sample the initial temporal edge by sampling a temporally weighted distribution based on exponential and/or linear functions. Notably, the network embedding module 104 for continuous-time dynamic network embedding is flexible and can be implemented to support other temporally weighted distributions for selecting the initial temporal edge.

The network embedding module 104 may be implemented to bias the initial edge selection 126 using an exponential distribution, in which case each edge $e \in E_T$ is assigned the probability as in the following EQ2:

$$Pr(e) = \frac{\exp[\tau(e) - t_{min}]}{\sum_{e' \in E_t} \exp[\tau(e') - t_{min}]}$$

where $t_{min}$ is the minimum time associated with an edge in the dynamic graph. This defines a distribution that heavily favors edges appearing later in time (e.g., the node associations 118 with more recent temporal values).

The network embedding module 104 may also be implemented to bias the initial edge selection 126 using a linear distribution. When the time difference between two time-wise consecutive edges is relatively large, the network embedding module 104 may map the edges to discrete time steps. For example, let $\eta: E_T \rightarrow \mathbb{Z}^+$ be a function that sorts the edges in the dataset in ascending order by time, where $\eta$ maps each edge to an index with $\eta(e) = 1$ for the earliest edge e. In this case, each edge $e \in \eta(E_T)$ will be assigned the probability as in the following EQ3:

$$Pr(e) = \frac{\eta(e)}{\sum_{e' \in E_t} \eta(e')}$$

The network embedding module 104 is implemented by the computing device for graph traversal 128 of one or more of the nodes 116 in the time-based graph 114 along the node associations 118 that represent the edges between the nodes, starting from the determined initial edge selection 126. The nodes 116 of the time-based graph 114 are traversed with respect to the temporal value 120 of each of the edges that associate the nodes, such as traversing the node associations 118 that occur later in time. The time-based graph 114 is traversed in increasing temporal value of each of the edges effective to traverse a subsequent node association that occurs later in time than a previous node association. The network embedding module 104 can be implemented to traverse the nodes 116 in the time-based graph 114 using a random unbiased traversal with respect to traversing the node associations that occur later in time, or alternatively, using a random biased traversal with respect to traversing the node associations that occur later in time and closer to the current time.

Notably, after the initial edge selection 126 of the initial edge $e_i = (u, v, t)$ at time t to begin the temporal random walk (e.g., a graph traversal 128), the set of temporal neighbors of a node v at time t is $\Gamma_t(v)$ defined as in the following EQ4:

$$\Gamma_t(v) = \{(w, t') | e = (v, w, t') \in E_T \wedge \mathcal{T}(e) > t\}$$

Notably, it is possible for the same neighboring node w to appear in $\Gamma_t(v)$ multiple times since multiple temporal edges can exist between the same pair of nodes 116. For example, two individuals may exchange multiple email messages over the course of time, where each node association 118 is an edge in the time-based graph 114 that represents a contact (e.g., email, phone call, proximity) between the two entities. A temporal random walk (e.g., a graph traversal 128) then represents a feasible route for information and data through the dynamic network, where sequences of events are valid when captured considering the temporal aspects, and node embeddings can be learned that accurately capture the dynamics in the network, such as the real-world interactions or flow of information among the nodes based on time.

The network embedding module 104 can determine the next node in a temporal random walk from the set $\Gamma_t(v)$, where a second distribution $\mathbb{F}_T$ is used to temporally bias the neighbor node selection. Again, this distribution can either be uniform with no bias applied, or more intuitively, the distribution can be biased to consider the temporal aspects of time. For instance, the network embedding module 104 can be implemented to bias the sampling strategy to reflect a graph traversal 128 that exhibits smaller "in-between" time for consecutive edges (e.g., the node associations 118). That is, for each consecutive pair of edges (u, v, t), and (v, w, t+k) in the random walk, k will be relatively small. For a temporal link prediction on a dynamic social network, restricting the "in-between" time provides for sample walks that do not group friends from different time periods together. As an example, if k is small, then the network embedding module 104 is likely to sample the random walk sequence $(v_1, v_2, t)$, $(v_2, v_3, t+k)$ which makes sense as the individuals represented by nodes $v_1$ and $v_3$ are more likely to know each other since $v_2$ has interacted with them both recently. On the other hand, if k is relatively large, then the network embedding module 104 is unlikely to sample the sequence. In this example, this separates the individuals that $v_2$ interacted with during very different time periods, as they are less likely to know each other.

The network embedding module 104 can be implemented for unbiased temporal neighbor node selection in the time-based graph 114. Given an arbitrary edge e=(u, v, t), each temporal neighbor $w \in \Gamma_t(v)$ of node v at time t has the following probability of being selected as in the following EQ5:

$$Pr(w) = 1/|\Gamma_t(v)|$$

Further, the network embedding module 104 can implement two techniques to bias the temporal random walks (e.g., graph traversal 128) by sampling the next node 116 in a temporal walk via temporally weighted distribution based on exponential and linear functions. Notably, the network embedding module 104 for continuous-time dynamic network embedding is flexible and can be implemented for use with other application or domain-dependent temporal bias functions. The network embedding module 104 can implement an exponential decay and formulate the probability, such as for an arbitrary edge e=(u, v, t), each temporal neighbor $w \in \Gamma_t(v)$ has the probability of being selected as in the following EQ6:

$$Pr(w) = \frac{\exp[\tau(w) - \tau(v)]}{\sum_{w' \in \Gamma_t(v)} \exp[\tau(w') - \tau(v)]}$$

Note that the value $\tau$ is used to mean the mapping to the corresponding time, which is similar to the exponentially decaying the probability of consecutive contacts observed in the spread of computer viruses and worms. The network embedding module 104 can also implement a linear function and define $\delta: V \times \mathbb{R}^+ \to \mathbb{Z}^+$ as a function that sorts temporal neighbors in descending order time-wise. The probability of each temporal neighbor $w \in \Gamma_t(v)$ of node v at time t is then defined as a distribution that biases the selection towards edges closer in time to the current node as in the following EQ7:

$$Pr(w) = \frac{\delta(w)}{\sum_{w' \in \Gamma_t(v)} \delta(w')}$$

In implementations, the network embedding module 104 may encounter temporal context windows during graph traversal 128. Given that temporal walks preserve time, the graph traversal may run out of temporally valid edges to traverse, in which case, a strict length on the sampled temporal walks is not imposed by the network embedding module. Rather, the network embedding module 104 implements each temporal walk to have a minimum length $\omega$, which is equivalent to the context window size for skip-gram. A maximum length L can be provided to accommo-date longer graph traversals. Hence, when generating a set of temporal walks, any temporal walk $S_{t_i}$ with length $\omega \leq |S_{t_i}| \leq L$ is considered valid. Given a set of temporal random walks $\{S_{t_1}, S_{t_2}, \ldots, S_{t_k}\}$, a temporal context window count $\beta$ is defined as the total number of context windows of size $\omega$ that can be derived from the set of temporal random walks, and when sampling a set of temporal walks, $\beta$ can be set to be a multiple of N=|V| as in the following EQ8:

$$\beta = \sum_{i=1}^{k} |S_{t_i}| - \omega + 1$$

In aspects of time-dependent network embedding, the network embedding module 104 is implemented by the computing device 102 to determine a time-dependent embedding 130 for each of the nodes 116 traversed in the time-based graph 114. The time-dependent embeddings 130 for each of the respective nodes 116 are representative of feature values that describe a respective node. For example, the time-based graph 114 represents the CTDN 122 that evolves over time, and the feature values are of d-dimensional features to which machine learning can be applied to determine a time-dependent network representation of the continuous-time dynamic network. Generally, the time-dependent embeddings 130 are the features of the network nodes 116, and the network embedding module 104 is implemented to temporally bias the learning of the embeddings for time-dependent network representation. As described herein, the time-dependent embeddings may be used or referred to interchangeably with the terms features, representations, and encodings as pertaining to the network nodes.

Given a temporal walk $S_t$ (e.g., a graph traversal 128), the network embedding module 104 can determine the time-dependent embeddings (also referred to as learning the time-preserving node embeddings) in the CTDN 122 as the optimization problem in the following EQ9:

$$\max_{f} \log Pr(W_t = \{v_{i-\omega}, \ldots, v_{i+\omega}\} \setminus v_i | f(v_i))$$

where the function $f: V \to \mathbb{R}^D$ is the node embedding function, $\omega$ is the context window size for optimization, and $W_T = \{v_{i-\omega}, \ldots, v_{i+\omega}\}$ such that $\mathcal{T}(v_{i-\omega}, v_{i-\omega+1}) > \ldots < \mathcal{T}(v_{i+\omega-1}, \omega_{i+\omega})$ is an arbitrary temporal context window $W_T \subseteq S_t$. A conditional independence is assumed between the nodes of a temporal context window when observed with respect to the source node $v_i$ as in the following EQ10:

$$Pr(W_T | f(v_i)) = \prod_{v_{i+k} \in W_T} Pr(v_{i+k} | f(v_i))$$

Given the time-based graph G, $\mathbb{S}$ is the space of all possible random walks (e.g., graph traversal 128) on G, and $\mathbb{S}_T$ is the space of all temporal random walks on G. Notably, the space of temporal random walks $\mathbb{S}_T$ is contained within $\mathbb{S}$, and $\mathbb{S}_T$ represents only a small fraction of possible random walks in $\mathbb{S}$. Conventional techniques sample a set of random walks S from $\mathbb{S}$, whereas the network embedding module 104 is implemented to sample a set of temporal random walks $S_t$ from $\mathbb{S}_T \subseteq \mathbb{S}$. The following algorithm summarizes an example of the network embedding module 104 implemented to learn the time-dependent embeddings 130 for the CTDN 122.

```
Input:
     a (un)weighted and (un)directed dyanamic network G = (V, E_T, 𝒯),
     temporal context weindow count β context window size ω,
     embedding dimensions D.
1    Set maximum walk length L = 80
2    Initialize set of temporal walks S_T to φ
3    Inititalize number of context windows C = 0
4    Precompute sampling distribution ℙ_s using G
         ℙ_s ∈ {Uniform, Exponential, Linear}
5    G' = (V, E_T, 𝒯, ℙ_s)
6    while β − C > 0 do
7        Sample an edge e_* = (v, u) via distribution ℙs
8        t = 𝒯(e_*)
9        S_t = TEMPORALWALK(G', e_* = (v, u), t, L, ω + β − C −1)
10       if |S_t| > ω then
11           Add the temporal walk S_t to S_T
12           C = C + (|S_t| − ω + 1)
13   end while
14   Z = STOCHASTICGRADIENTDESCENT(ω, D, S_T)
15   return the dynamic node embedding matrix Z
```

In implementations, the network embedding module 104 includes a parameter that can be tuned. For example, the temporal walks (e.g., graph traversal 128) are allowed to have arbitrary lengths, which are simply restricted to between the range [ω, L], a given that arbitrary-sized traversals between ω and L, allowing for more accurate representations of node behaviors. For instance, a graph traversal 128 starting at node u can return to node u after traversing L edges, indicating a closed community. On the other hand, another graph traversal 128 starting from node v can end immediately at minimum length ω without ever returning back to node v. These are two distant cases that would be misrepresented if a fixed random walk length is imposed. Regarding the sensitivity of ω and L, they do not affect the overall performance by a large margin for time-based graphs, but still may be modified.

In other implementations, the network embedding module 104 can use the base b of the exponential function for the exponential distributions, such as used to bias the temporal random walk (as in EQ6 above) or to bias the selection of the initial edge to begin the temporal walk (as in EQ2 above). In the case of the initial edge selection 126 (EQ6), a relatively large base b would cause the function to grow rapidly. Notably, if the temporal interactions (e.g., the node associations 118 as the edges) of the time-based graph 114 span a large time period, the probability of selecting one of the recent edges may be much larger than the probability of selecting all other edges resulting in sampled walks that are skewed towards recent edges.

Figure 2:
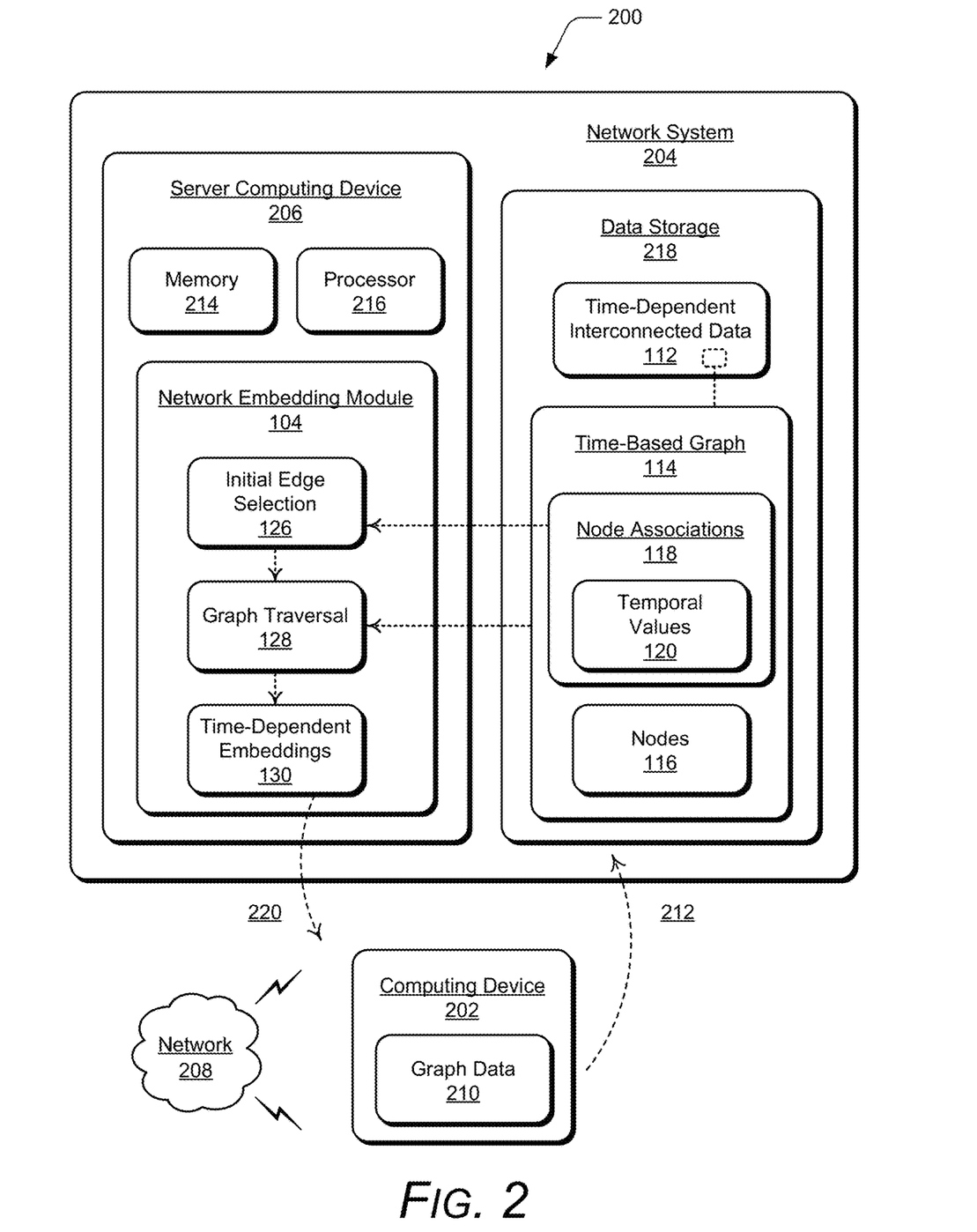
FIG. 2 illustrates another example environment in which aspects of time-dependent network embedding can be implemented.

FIG. 2 illustrates another example environment 200 in which aspects of time-dependent network embedding can be implemented. The example environment 200 includes a computing device 202 and a network system 204, which implements features of the network embedding module 104. The computing device 202 can be implemented as any type of computing device described herein, such as the computing device 102 shown and described with reference to FIG. 1. In this example environment 200, the computing device 202 may include any number and combination of different components as further described with reference to the example device shown in FIG. 5, and is implemented to access and communicate with a server computing device 206 of the network system 204, such as via a communication network 208.

A user of the computing device 202 may upload graph data 210 to the network system 204, where the graph data 210 may be the time-dependent interconnected data 112, the time-based graph 114, or any other type of graph data that represents a dynamic network. The network system 204 can receive the uploaded graph data 210 as an input to the network embedding module 104 from the computing device 202, as indicated at 212 via the network 208.

Any of the devices, servers, and/or services described herein can communicate via the network 208, such as for data communication between the computing device 202 and the network system 204. The network 208 can be implemented to include a wired and/or a wireless network. The network can also be implemented using any type of network topology and/or communication protocol, and can be represented or otherwise implemented as a combination of two or more networks, to include IP-based networks and/or the Internet. The network 208 may also include mobile operator networks that are managed by a mobile network operator and/or other network operators, such as a communication service provider, mobile phone provider, and/or Internet service provider.

In this example environment 200, the network system 204 is representative of any number of cloud-based access sites that provide a service and/or from which data and information is available, such as via the Internet, for on-line and/or network-based access. The network system 204 can be accessed on-line, and includes the server computing device 206, which is representative of one or more hardware server devices (e.g., computing devices) that may be implemented at the network system. The server computing device 206 includes memory 214 and a processor 216, and may include any number and combination of different components as further described with reference to the example device shown in FIG. 5.

In this example environment 200, the server computing device 206 implements the network embedding module 104, such as in software, in hardware, or as a combination of software and hardware components, generally as shown and described with reference to FIG. 1. In this example, the network embedding module 104 is implemented as a software application or modules, such as executable software instructions (e.g., computer-executable instructions) that are executable with a processing system (e.g., the processor 216) of the server computing device 206 to implement the techniques of time-dependent network embedding. The network embedding module 104 can be stored on computer-readable storage media, such as any suitable memory device (e.g., the device memory 214) or electronic data storage implemented in the server computing device 206 and/or at the network system 204.

The network system 204 may include multiple data storage, server devices, and applications, and can be implemented with various components as further described with reference to the example device shown in FIG. 5. The network system 204 also includes data storage 218 that may be implemented as any suitable memory, memory device, or electronic data storage for network-based data storage. The data storage 218 is utilized at the network system 204 to maintain the time-dependent interconnected data 112 and/or the time-based graph 114, as shown and described with reference to FIG. 1.

In aspects of time-dependent network embedding, the network embedding module 104 can receive the graph data 210, as uploaded from the computing device 202, such as in the form of the time-based graph 114. As shown and described with reference to FIG. 1, the network embedding module 104 is implemented to determine one of the node associations 118 in the time-based graph as the initial edge selection 126 from which to start traversing the nodes 116 in the time-based graph 114. In implementations, the determination of the one node association as the initial edge selection 126 from which to start traversing the graph can be based on sampling an initial time from a distribution of the temporal values 120 of the respective node associations 118, or can be determined based on sampling an arbitrary distribution of the node associations.

The network embedding module is implemented by the server computing device 206 to traverse one or more of the nodes 116 in the time-based graph 114 along the node associations 118 that represent the edges between the nodes, starting from the determined initial edge selection 126. The nodes 116 of the time-based graph 114 are traversed with respect to the temporal value 120 of each of the edges that associate the nodes, such as traversing the node associations 118 that occur later in time. The time-based graph 114 is traversed in increasing temporal value 120 of each of the edges effective to traverse a subsequent node association that occurs later in time than a previous node association. The network embedding module 104 can be implemented to traverse the nodes 116 in the time-based graph 114 using a random unbiased traversal with respect to traversing the node associations 118 that occur later in time, or alternatively, using a random biased traversal with respect to traversing the node associations 118 that occur later in time and closer to the current time.

The network embedding module 104 is also implemented by the server computing device 206 to determine the time-dependent embedding 130 for each of the nodes 116 traversed in the time-based graph 114. The time-dependent embeddings 130 for each of the respective nodes 116 are representative of feature values that describe a respective node. The time-dependent embeddings 130 can then be communicated as feedback from the network system 204 to the computing device 202, as indicated at 220 via the network 208. A user of the computing device 202 can then run algorithms with their own graph data 210 and the received time-dependent embeddings 130.

The graph data 210 is transformed into the feature-based representations that reflect the structural properties in the graph, so that a data user can run any machine learning algorithms with the feature-based representations and build model representations of the dynamic network. For instance, in recommendation systems with users who are associated to other entities (e.g., items, events, pages, groups, users, locations, restaurants, businesses, etc.) that are being recommended, the users (nodes) are linked (associated) to the entities over time, which can be modeled by the network embedding module 104, significantly improving prediction analytics.

Figure 3:
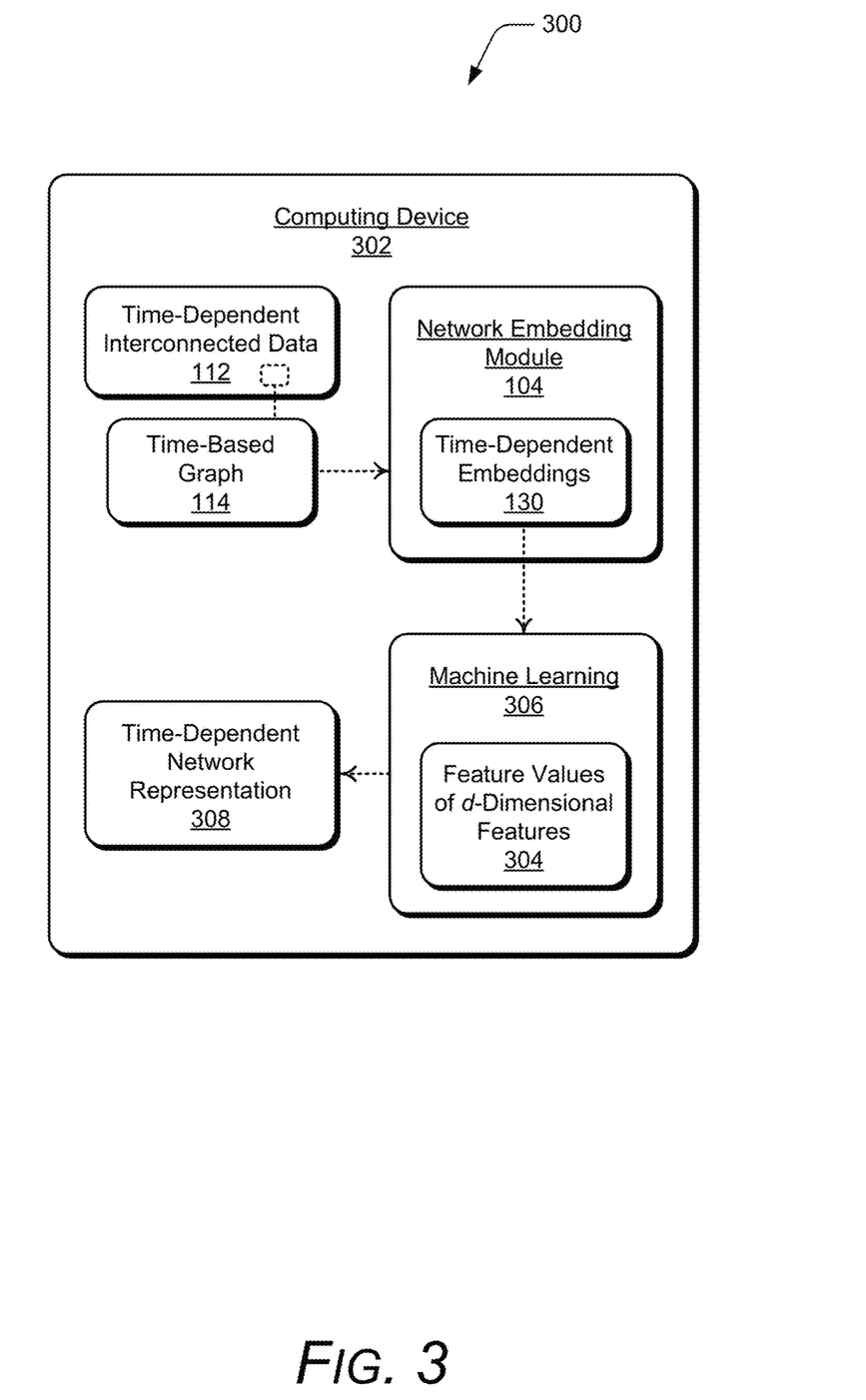
FIG. 3 illustrates another example environment in which aspects of time-dependent network embedding can be implemented.

FIG. 3 illustrates an example environment 300 in which aspects of time-dependent network embedding can be implemented. The example environment 300 includes a computing device 302, which implements features of the network embedding module 104 as shown and described with reference to FIGS. 1 and 2. The computing device 302 can be implemented as any type of computing device described herein, such as the computing device 102 (FIG. 1) or the server computing device 206 (FIG. 2). In this example environment 300, the computing device 302 may include any number and combination of different components as further described with reference to the example device shown in FIG. 5, and as noted above, may be implemented to access and communicate with the server computing device 206 of the network system 204, such as via the communication network 208.

As described above, the network embedding module 104 is implemented by the computing device 302 to determine the time-dependent embeddings 130 for the nodes 116 traversed in the time-based graph 114. The time-dependent embeddings 130 for each of the respective nodes 116 are representative of feature values 304 that describe the respective graph nodes. For example, the time-based graph 114 represents the continuous-time dynamic network (CTDN) 122 that evolves over time, and the feature values 304 are of d-dimensional features to which machine learning 306 can be applied to determine a time-dependent network representation 308 of the continuous-time dynamic network. Generally, the time-dependent embeddings 130 are the features of the network nodes 116, and the network embedding module 104 is implemented to temporally bias the learning of the embeddings for time-dependent network representation. The machine learning 306 can receive the time-dependent embeddings 130, as generated by the network embedding module 104 shown and described with reference to FIGS. 1 and 2.

In this example, the computing device 302 implements the machine learning 306, such as in software, in hardware, or as a combination of software and hardware components. The machine learning can be implemented as any type of a neural network or machine learning model, referring to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

Example method 400 is described with reference to FIG. 4 in accordance with one or more aspects of time-dependent network embedding. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
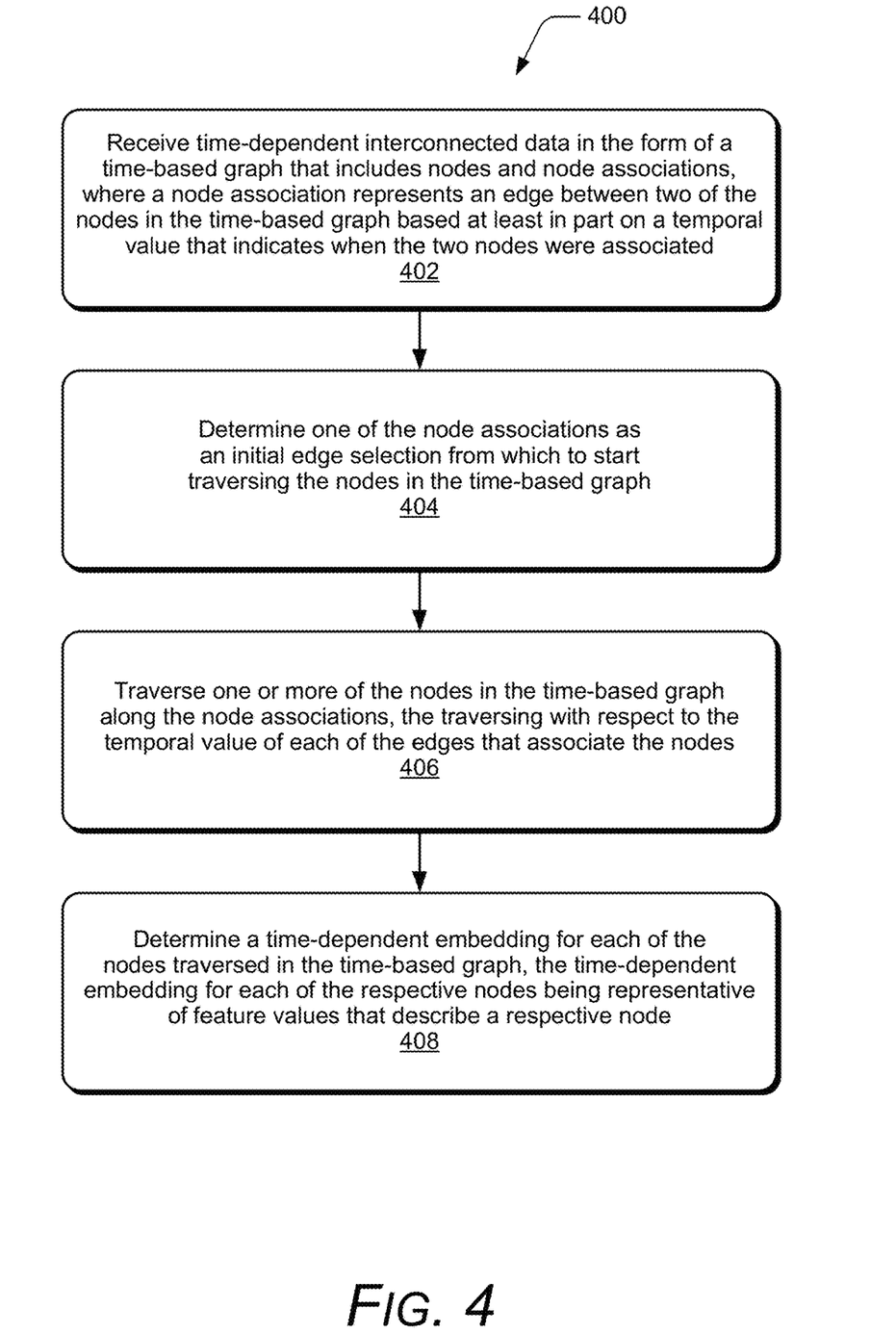
FIG. 4 illustrates an example method of time-dependent network embedding in accordance with one or more implementations.

FIG. 4 illustrates example method(s) 400 for time-dependent network embedding, and is generally described with reference to the network embedding module as shown and described with reference to FIGS. 1-3. The order in which the method is described is not intended to be construed as a limitation, and any number or combination of the method operations can be combined in any order to implement a method, or an alternate method.

At 402, time-dependent interconnected data is received in the form of a time-based graph that includes nodes and node associations that each represent an edge between two of the nodes in the time-based graph based at least in part on a temporal value that indicates when the two nodes were associated. For example, the network embedding module 104, as implemented by the computing device 102 and/or the server computing device 206, receives the time-dependent interconnected data 112 in the form of the time-based graph 114 that includes the nodes 116 and the node associations 118 that each represent an edge between two of the nodes in the time-based graph based at least in part on a temporal value 120 that indicates when the two nodes were associated. Additionally, any number of the node associations 118 that represent an edge between two of the nodes 116 of the time-based graph 114 may be based on temporal values 120 that include a start time and an end time. The time-based graph 114 is representative of a dynamic network that evolves over time as one or more of the nodes 116 are at least one of added, deleted, or updated in the time-based graph 114 and identified by the increasing temporal value 120. The time based graph may be representative of the continuous-time dynamic network (CTDN) 122 that evolves over time, such as a social network that evolves over time as members of the social network interact with each other, where the node associations 118 each represent an interaction between two of the members of the social network.

At 404, one of the node associations is determined as an initial edge selection from which to start traversing the nodes in the time-based graph. For example, the network embedding module 104 determines one of the node associations 118 as an initial edge selection 126 from which to start traversing the nodes 116 in the time-based graph 114. The network embedding module 104 can determine the one node association 118 as the initial edge selection 126 from which to start traversing the time-based graph 114 based on sampling an initial time from a distribution of the temporal values 120 of the respective node associations. Alternatively, the network embedding module 104 can determine the one node association 118 as the initial edge selection 126 from which to start traversing the time-based graph 114 based on sampling an arbitrary distribution of the node associations.

At 406, one or more of the nodes in the time-based graph are traversed along the node associations, the traversing with respect to the temporal value of each of the edges that associate the nodes. For example, the network embedding module 104 traverses one or more of the nodes 116 in the time-based graph 114 along the node associations 118, where the traversing is performed with respect to the temporal value 120 of each of the edges that associate the one or more nodes. The network embedding module 104 traverses the one or more nodes 116 in increasing temporal value of each of the edges effective to traverse a subsequent node association that occurs later in time than a previous node association. The network embedding module 104 traverses the one or more nodes 116 in the time-based graph 114 as a random unbiased traversal with respect to traversing the node associations 118 that occur later in time. Alternatively, the network embedding module 104 traverses the one or more nodes 116 in the time-based graph 114 as a random biased traversal with respect to traversing the node associations that occur later in time and closer to the current time.

At 408, a time-dependent embedding is determined for each of the nodes traversed in the time-based graph, the time-dependent embedding for each of the respective nodes being representative of feature values that describe a respective node. For example, the network embedding module 104 determines a time-dependent embedding 130 for each of the nodes 116 traversed in the time-based graph 114, where the time-dependent embedding 130 for each of the respective nodes 116 is representative of feature values 304 that describe a respective node. Generally, the time-based graph 114 is representative of the continuous-time dynamic network 122 that evolves over time, and the feature values 304 are of d-dimensional features to which machine learning 306 can be applied to determine the time-dependent network representation 308 of the continuous-time dynamic network.

Figure 5:
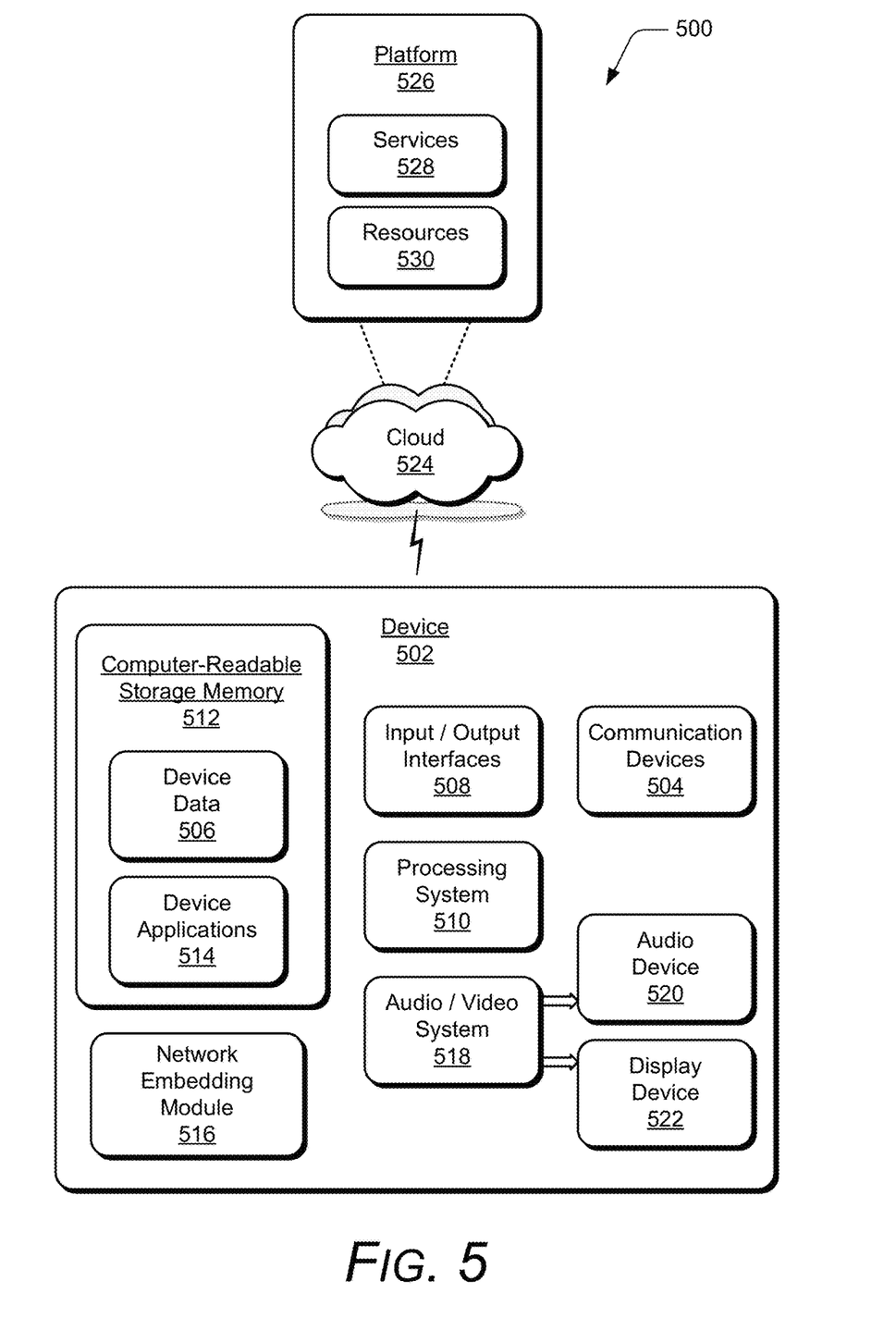
FIG. 5 illustrates an example system with an example device that can implement aspects of time-dependent network embedding.

FIG. 5 illustrates an example system 500 that includes an example device 502, which can implement techniques of time-dependent network embedding. The example device 502 can be implemented as any of the computing devices, mobile devices, server devices, and/or services described with reference to the previous FIGS. 1-4, such as any type of computing device, client device, mobile phone, tablet, communication, entertainment, gaming, media playback, and/or other type of device. For example, the computing device 102, the computing device 302, the server computing device 206, and/or various server devices of the network system 204 may be implemented as the example device 502.

The example device 502 includes communication devices 504 that enable wired and/or wireless communication of device data 506, such as the time-dependent interconnected data, the time-based graph, the node data, the graph data, the time-dependent embeddings, the feature values, the time-dependent network representation, as well as computer applications data and content that is transferred from one computing device to another, and/or synched between multiple computing devices. The device data 506 can include any type of audio, video, image, and/or graphic data that is generated by applications executing on the device. The communication devices 504 can also include transceivers for cellular phone communication and/or for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 502. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The example device 502 also includes computer-readable storage memory 512, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 512 can include various implementations of random access memory (RAM), read-only memory (ROM), flash memory, and other types of storage memory in various memory device configurations.

The computer-readable storage memory 512 provides storage of the device data 506 and various device applications 514, such as an operating system that is maintained as a software application with the computer-readable storage memory and executed by the processing system 510. In this example, the device 502 includes a network embedding module 516 that implements the described techniques of time-dependent network embedding, and may be implemented with hardware components and/or in software as one of the device applications 514, such as when the example device 502 is implemented as the computing device 102, the computing device 302, and/or the server computing device 206 shown in FIGS. 1-3. An example of the network embedding module 516 includes the network embedding module 104 that is implemented as a software application and/or as hardware components by the computing device 102, the computing device 302, the server computing device 206, and/or by other various server devices of the network system 204, as described with reference to FIGS. 1-4. In implementations, the network embedding module 516 may include independent processing, memory, and logic components as a computing and/or electronic device integrated with the device 502.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device. In embodiments, at least part of the techniques described for time-dependent network embedding may be implemented in a distributed system, such as over a "cloud" 524 in a platform 526. The cloud 524 includes and/or is representative of the platform 526 for services 528 and/or resources 530. For example, the services 528 may include the network system 204 described with reference to FIGS. 1-4.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although implementations of time-dependent network embedding have been described in language specific to features and/or methods, the appended claims are not necessarily limited to the specific features or methods described. Rather, the specific features and methods are disclosed as example implementations of time-dependent network embedding, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for time-dependent network embedding, a method implemented by at least one computing device, the method comprising:
    receiving time-dependent interconnected data in the form of a time-based graph that includes nodes and node associations that each represent an edge between two of the nodes in the time-based graph based at least in part on a temporal value that indicates when the two nodes were associated;
    traversing two or more of the nodes in the time-based graph along the node associations in a time increasing order, the traversing in the time increasing order with respect to the temporal value of each of the edges that associate the two or more nodes; and
    determining a time-dependent embedding for each of the two or more nodes traversed in the time-based graph, the time-dependent embedding for each of the respective two or more nodes being representative of feature values that describe the respective node.

2. The method as recited in claim 1, further comprising determining one of the node associations as an initial edge selection from which to start the traversing the two or more nodes in the time-based graph.

3. The method as recited in claim 2, wherein the determining the one node association as the initial edge selection from which to start the traversing is based on sampling an initial time from a distribution of the temporal value of the respective node associations.

4. The method as recited in claim 2, wherein the determining the one node association as the initial edge selection from which to start the traversing is based on sampling an arbitrary distribution of the node associations.

5. The method as recited in claim 1, wherein said traversing the two or more nodes in increasing temporal value of each of the edges effective to traverse a subsequent node association that occurs later in time than a previous node association.

6. The method as recited in claim 5, wherein the time-based graph is representative of a dynamic network that evolves over time as one or more of the nodes are at least one of added, deleted, or updated in the time-based graph and identified by the increasing temporal value.

7. The method as recited in claim 1, wherein the traversing the two or more nodes in the time-based graph is one of:

a random unbiased traversal with respect to traversing the node associations that occur later in time; or a random biased traversal with respect to traversing the node associations that occur later in time and closer to the current time.

8. The method as recited in claim 1, wherein:

the nodes in the time-based graph include timestamps; and the traversing the one or more nodes in the time-based graph is performed as a fixed number of temporal walks from each one of the nodes.

9. The method as recited in claim 1, wherein:

the time-based graph is representative of a continuous-time dynamic network that evolves over time; and the feature values are of d-dimensional features to which machine learning is applied to determine a time-dependent network representation of the continuous-time dynamic network.

10. The method as recited in claim 1, wherein:

the time-based graph is representative of a social network that evolves over time as members of the social network interact with each other;

the node associations each representing an interaction between two of the members of the social network; and said traversing the one or more nodes with respect to traversing the node associations that occur later in time.

11. A computing device implemented for time-dependent network embedding in a digital medium environment, the computing device comprising:

a memory to maintain time-dependent interconnected data in the form of a time-based graph that includes nodes and node associations that each represent an edge between two of the nodes in the time-based graph based at least in part on a temporal value that indicates when the two nodes were associated;

a processor system configured to execute a network embedding module implemented to:

traverse two or more of the nodes in the time-based graph along the node associations in a time increasing order, the traverse of the two or more nodes in the time increasing order representing a temporally valid sequence with respect to the temporal value of each of the edges that associate the two or more nodes; and determine a time-dependent embedding for each of the two or more nodes traversed in the time-based graph, the time-dependent embedding for each of the respective two or more nodes describing the respective node.

12. The computing device as recited in claim 11, wherein the network embedding module is implemented to determine one of the node associations as an initial edge selection from which to start the traverse of the two or more nodes in the time-based graph.

13. The computing device as recited in claim 12, wherein the network embedding module is implemented to determine the one node association as the initial edge selection from which to start the traverse based on sampling an initial time from a distribution of the temporal value of the respective node associations.

14. The computing device as recited in claim 12, wherein the network embedding module is implemented to determine the one node association as the initial edge selection from which to start the traverse is based on sampling an arbitrary distribution of the node associations.

15. The computing device as recited in claim 11, wherein the network embedding module is implemented to traverse the two or more nodes in increasing temporal value of each of the edges effective to traverse a subsequent node association that occurs later in time than a previous node association.

16. The computing device as recited in claim 11, wherein the time-based graph is representative of a dynamic network that evolves over time as one or more of the nodes are at least one of added, deleted, or updated in the time-based graph and identified by the increasing temporal value.

17. The computing device as recited in claim 11, wherein the node associations that each represent an edge between two of the nodes in the time-based graph are based on temporal values that include a start time and an end time.

18. The computing device as recited in claim 11, wherein the network embedding module is implemented to traverse the two or more nodes in the time-based graph as one of:

a random unbiased traversal with respect to traversal of the node associations that occur later in time; or a random biased traversal with respect to traversal of the node associations that occur later in time and closer to the current time.

19. The computing device as recited in claim 11, wherein:

the time-dependent embedding for each of the respective one or more nodes is representative of feature values that describe the respective node; and the time-based graph is representative of a continuous-time dynamic network that evolves over time, the feature values being of d-dimensional features to which machine learning is applied to determine a time-dependent network representation of the continuous-time dynamic network.

20. In a digital medium environment, a system implemented for time-dependent network embedding, the system comprising:

means for storing time-dependent interconnected data in the form of a time-based graph that includes nodes and node associations that each represent an edge between two of the nodes in the time-based graph based at least in part on temporal values that indicate when the two nodes were associated, the temporal values including a start time and an end time;

means for traversing two or more of the nodes in the time-based graph along the node associations in a time increasing order, the traversing in the time increasing order with respect to the temporal values of each of the edges that associate the two or more nodes; and means for determining a time-dependent embedding for each of the two or more nodes traversed in the time-based graph, the time-dependent embedding for each of the respective two or more nodes being representative of feature values that describe the respective node.

* * * * *